March 5, 1963 J. G. E. COHN ET AL 3,080,444
ELECTRIC CELL
Filed June 28, 1960 2 Sheets-Sheet 1

INVENTORS
JOHANN G. E. COHN
ANNA P. HAUEL
BY Karl Huber
James E. Bryan
Alan C. Rose
ATTORNEYS

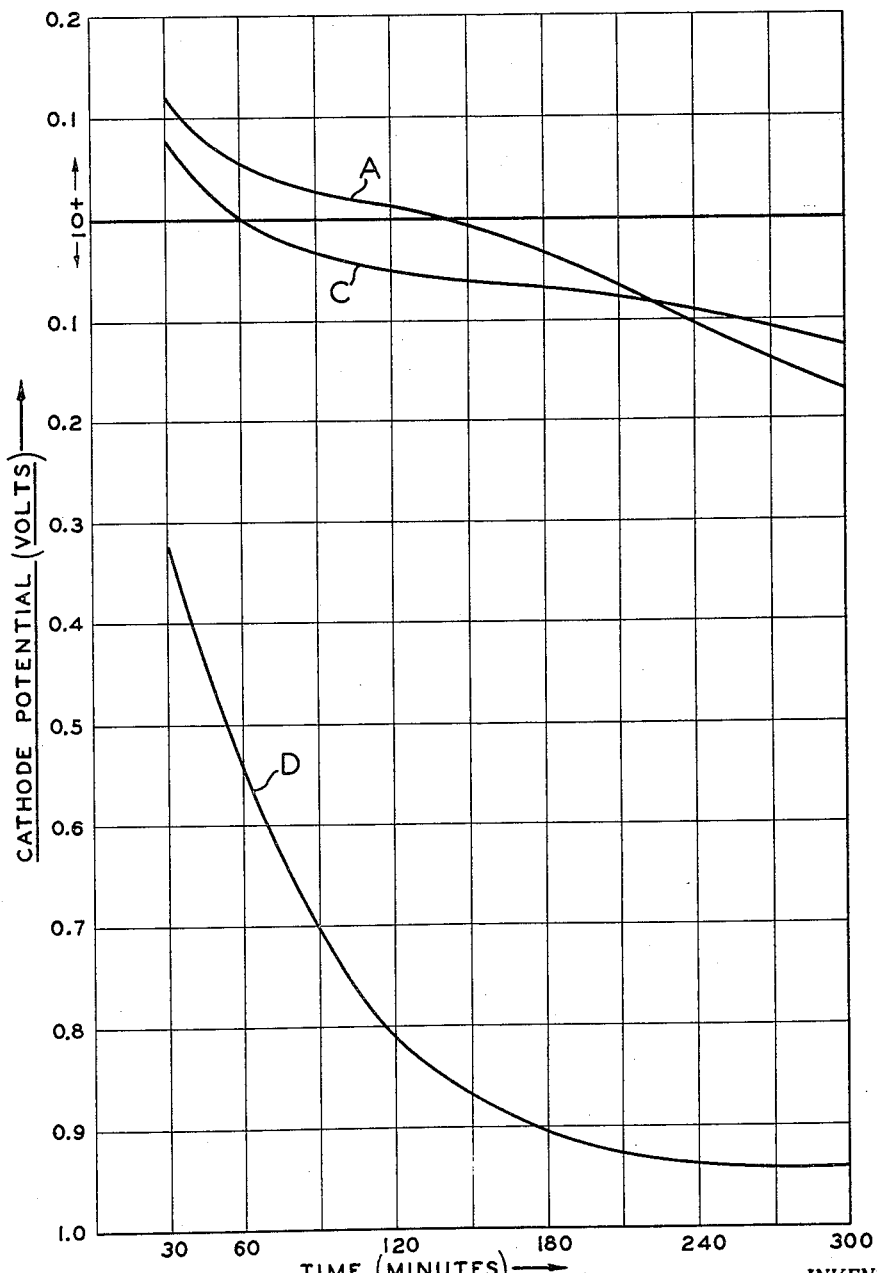

United States Patent Office 3,080,444
Patented Mar. 5, 1963

3,080,444
ELECTRIC CELL
Johann G. E. Cohn and Anna P. Hauel, West Orange, N.J., assignors to Engelhard Industries, Inc., Newark, N.J., a corporation of Delaware
Filed June 28, 1960, Ser. No. 39,289
12 Claims. (Cl. 136—100)

The present invention relates to cells for generating electricity.

As is well known, the standard dry cell includes zinc as the anode or anodic reactant, and manganese dioxide as the cathodic reactant or "depolarizer." The manganese dioxide is normally mixed with carbon, and this mixture is pressed around a carbon rod which serves as the positive terminal of the dry cell.

In the Leclanché dry cell described above, electricity is generated by the anodic oxidation of the metallic zinc and the cathodic reduction of manganese dioxide. Hydroxyl ions are generated concurrently with the cathodic reduction of the manganese dioxide. In the electrolyte, positive ions formed at the anode combine with the hydroxyl ions generated at the cathode. When the zinc anode and the cathode are externally connected by an electric circuit, electrons flow from the zinc to the cathode, and thus allow the reaction to continue.

While the Leclanché cell has withstood the test of time, and is still widely used, it has several drawbacks for specific purposes. For example, for applications where weight must be minimized, the manganese dioxide depolarizer is relatively heavy per unit of derived current.

Accordingly, important objects of the present invention include maintenance of a more constant discharging voltage and reduction of the weight of the cathodic reactant of such cells.

These objects are achieved, in accordance with the present invention by the use of hydroxylamine as the cathodic reactant or depolarizer in an electricity generating cell. Cells employing this cathodic reactant have a relatively constant discharging voltage. In addition, hydroxylamine is a relatively light weight cathodic reactant; thus, manganese dioxide weighs several times as much as hydroxylamine, for an equivalent amount of cathodic reactant.

Other objects, features and advantages of the invention may be readily apprehended from a consideration of the following detailed description and from the drawings, in which:

FIG. 3 is a plot showing cathode potential versus time during a discharge at a constant current rate for various electric cells.

Figure 1:
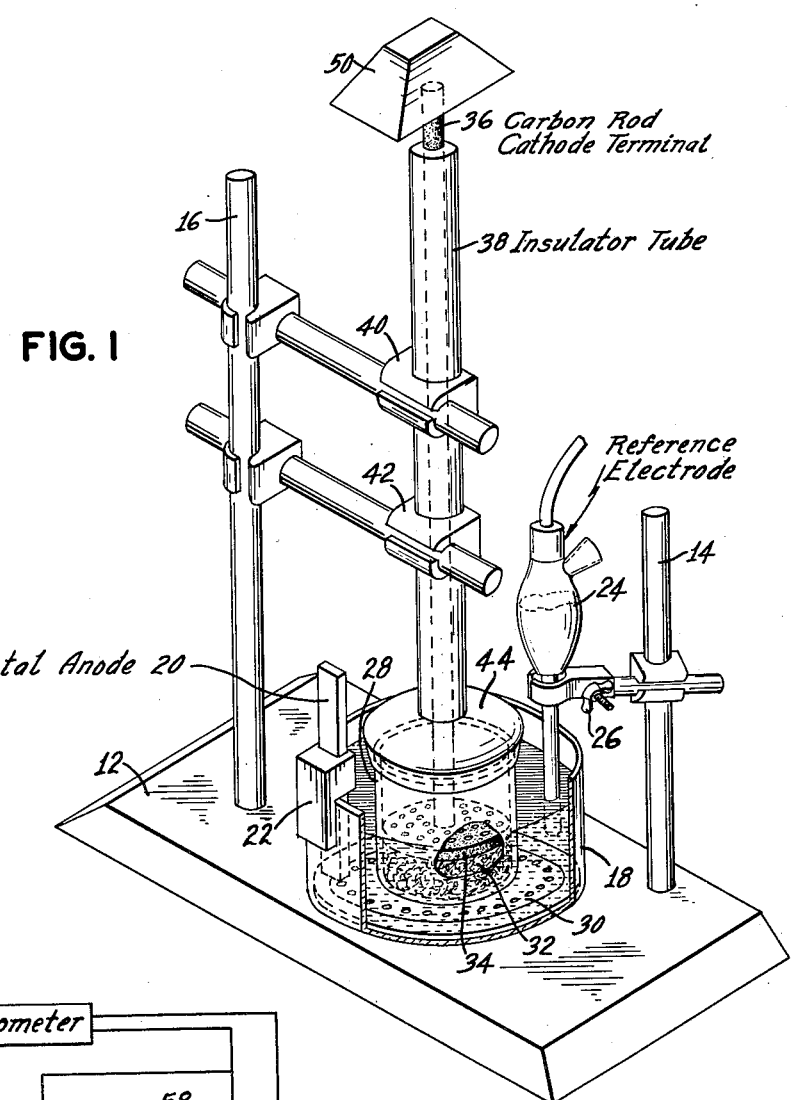
FIG. 1 shows a cell employed for electric cell testing purposes.

With reference to FIG. 1 of the drawings, an arrangement is shown which conveniently permits the testing and comparison of cathodic reactants. It is a primary cell including a cathode assembly as described below. In the present case cathode potentials may be studied independently of anodic conditions by the use of a standard reference electrode. The apparatus is similar to that which has been used by others for electric cell experiments, see Journal of the Electrochemical Society, volume 103, pages 94 and 95, C. K. Morehouse and R. Glicksman, 1956.

The apparatus includes a base 12, two upright support members 14 and 16, and a container 18 which may be made of glass. The container 18 is partially filled with a suitable electrolyte as discussed below. A metal anode 20, which may suitably be of magnesium or zinc, is mounted by the support 22 with one end immersed in the electrolyte within the container 18. A calomel reference electrode 24 is mounted with its fiber tip immersed in the electrolyte. It is held in position by a suitable clamp 26, which is secured to the upright supporting member 14.

The cathode assembly includes a central hollow cylinder 28, which may be made of glass. The glass cylinder 28 rests on a perforated plastic disc 30, and a diaphragm (not shown) is inserted between the disc and the cylinder. This assembly is supported by the bottom of the container 18. Above the disc 30 and within the cylinder 28 is a mass of carbon powder 32, with a perforated carbon disc 34 overlying the powder. An elongated carbon rod 36 bears on the upper surface of the perforated carbon disc 34 and compresses the carbon powder 32. The cathodic reactant, hydroxylamine, was added to the electrolyte in the form of hydroxylamine hydrochloride. The hydroxylamine may also be supplied to the cell in pure form or in the form of other salts or other derivatives of hydroxylamine. It may be either added to the electrolyte or combined with the carbon powder 32. The important thing is to make hydroxylamine ($NH_2OH$) available at the cathode of the cell. When it is added to the electrolyte, the hydroxylamine has access to the carbon powder of the cathode structure through the perforated plastic disc 30 and the diaphragm mentioned above. The carbon rod 36 is slidably mounted within the insulating tube 38. The tube 38 is held upright by the brackets 40 and 42, which are mounted on the vertical supporting post 16. The cylinder 28 is closed by the apertured stopper 44 through which the carbon rod 36 passes. A weight 50, which, in the present case, weighed 2.5 kilograms, is mounted on the upper end of the carbon rod 36 to compress the carbon powder into a conductive mass.

Figure 2:
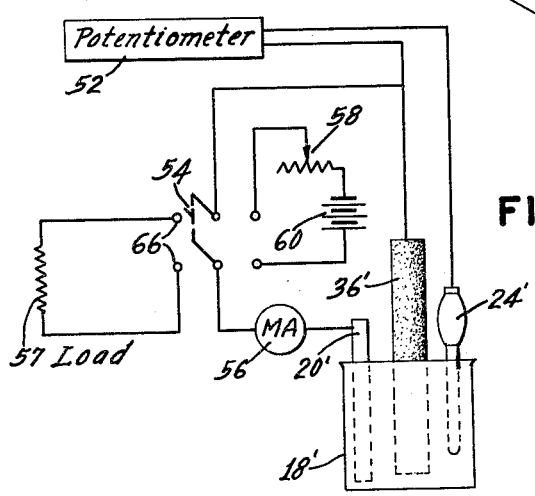
FIG. 2 represents circuitry employed with the apparatus of FIG. 1.

The circuit for the apparatus of FIG. 1 is shown in FIG. 2. In FIG. 2 the electrolytic cell is shown only schematically. Thus, the apparatus includes the container 18', the anode 20', the calomel reference electrode 24', and the cathode assembly 36'. The potentiometer 52 is connected between the cathode assembly 36' and the reference electrode 24'.

A double-pole, double-throw switch 54 is connected between the anode 20' and the cathode assembly 36'. A milliammeter 56 is connected in series with the anode 20', between the anode and the switch 54. By means of the switch 54, the anode to cathode circuit may be connected either to a suitable load, as represented by resistor 57, or to a circuit including variable resistor 58 and the source of direct current 60, which are employed in establishing suitable test conditions.

As mentioned above, in the testing of cathodic reactants, it is customary to isolate the cathodic structure from the action taking place at the anode. In addition, current is preferably passed through the cell at a constant rate. In connection with the present examples, a constant current flow of 15 milliamperes is maintained by connecting the source of direct current 60 and the variable resistance 58 into the anode-to-cathode circuit, and adjusting the resistance 58.

A number of tests employing hydroxylamine as the cathodic reactant were performed with the apparatus shown in FIG. 1. In each case, the minutes of operation were counted from a closing of the 15 milliampere circuit. The test conditions for four examples are given in the following Table I:

*Table I*

|  | Cell A | Cell B | Cell C | Cell D |
|---|---|---|---|---|
| Depolarizer | 3 gms. $NH_2OH$ | none | 3 gms. $NH_2OH$ | none. |
| Cathode | carbon | carbon | carbon | carbon. |
| Anode | Zinc | Zinc | Mg | Mg. |
| Electrolyte | 60 cc. of an aqueous solution containing per liter 200 gms. of $ZnCl_2$, 250 gms. of $NH_4Cl$ and the depolarizer. | 60 cc. of an aqueous solution containing per liter 200 gms. of $ZnCl_2$, 250 gms. of $NH_4Cl$. | 60 cc. of an aqueous solution containing per liter 250 gms. of $MgBr_2 6H_2O$ and the depolarizer; saturated with $Mg(OH)_2$. | 60 cc. of an aqueous solution containing per liter 250 gms. $MgBr_2 6H_2O$, saturated with $Mg(OH)_2$. |
| Operating Temp. | 28° C | 28° C | 28° C | 28° C. |
| Constant Current Rate, Milliamps. | 15 | 15 | 15 | 15. |

In Examples A and C, the weight of hydroxylamine is the weight of hydroxylamine included in the hydroxylamine hydrochloride which was added to the electrolyte, as mentioned above. The electrolyte for Example A was slightly acid about (pH 5) and that for Example C was basic about (pH 8.5).

In the reactions of Examples A and C set forth above, the metal is oxidized and the hydroxylamine is reduced. Energy produced by these reactions is available as electricity in much the same manner as in the case of the Leclanché cell described above.

Table II shows the cathode potential for the test conditions described in Table I. Examples B and D were control examples and involved tests in which no depolarizer, i.e. cathodic reactant, was employed:

*Table II*

| Minutes Cumulative | Cathode Potential (Volts) | | | |
|---|---|---|---|---|
|  | Cell A | Cell B | Cell C | Cell D |
| 30 | +0.126 | −0.145 | +0.086 | −0.325 |
| 60 | +0.064 | −0.236 | +0.003 | −0.541 |
| 90 | +0.033 |  | −0.031 | −0.703 |
| 120 | +0.019 |  | −0.041 | −0.811 |
| 180 | −0.020 |  | −0.061 | −0.898 |
| 240 | −0.090 |  | −0.060 | −0.939 |
| 300 | −0.164 |  | −0.122 | −0.939 |
| 360 | −0.253 |  | −0.174 |  |
| 420 | −0.325 |  | −0.255 |  |

The plots of FIG. 3 show the cathode potentials for the test conditions of Table I in graphical form. The letter designations of the plots correspond to the cell designations of Table I and Table II; accordingly, the curves designated A and C indicate the cathode potential with hydroxylamine present in the cell, with an acid and an alkaline electrolyte, respectively. Curve D shows the cathode potential when no hydroxylamine was present in the cell, and with an alkaline electrolyte corresponding to that of test condition C.

In the customary manner, the potential is expressed in volts which represent the potential difference between the cathode and a reference hydrogen electrode. Actual measurements were taken between the cathode and a commercial calomel reference electrode, and the calomel readings were then converted to standard "hydrogen potentials."

In addition to the use of hydroxylamine as the cathodic reactant in a cell as described, it may also be employed in a fuel cell. In this case, the hydroxylamine is fed into the cathodic section of the fuel cell and is again employed as an oxidizing agent to oxidize the anodic reactant which would also be supplied to the anode of the fuel cell.

With regard to advantages of hydroxylamine as a depolarizer, its relatively light weight has been noted above. It is also useful to compare hydroxylamine and manganese dioxide as cathodic depolarizers under fuel cell conditions. The Lelanché cell normally operates as a primary cell with an electrolyte having a pH of 5 to 7. Under these conditions the voltage decline rate, although quite high, is not considered excessive. However, the $MnO_2$ depolarizer used in the Lelanché cell is not satisfactory for use with an alkaline electrolyte and is therefore not suitable for fuel cells which generally require alkaline electrolytes.

The superiority of the hydroxylamine depolarizer of this invention to a $MnO_2$ depolarizer in the presence of an alkaline electrolyte may be appreciated through a comparison of cell C, which shows a low decline rate in FIG. 3 in the presence of an electrolyte at a pH of 8.5, with a $MnO_2$ depolarizer at the same pH. The latter depolarizer was tested in a cell with a carbon cathode, a magnesium anode and a magnesium bromide electrolyte. It was found to drop from a cathodic potential of +0.3 volt one hour after placing the cell in circuit to −0.7 volt after a 4½ hour period. In contrast, cell C had a cathodic potential after one hour of 0 volt and after 4½ hours of −0.1 volt. Thus, hydroxylamine is clearly superior to manganese dioxide as a depolarizer under the alkaline electrolyte conditions normally employed in fuel cells.

It is to be understood that the above-described arrangements are illustrative of the application of the principles of the invention. Numerous other arrangements may be devised by those skilled in the art without departing from the spirit and scope of the invention.

What is claimed is:

1. An electricity generating cell comprising an anode made of a metal selected from the group consisting of zinc and magnesium, a cathode including carbon, an electrolyte in contact with both said anode and said cathode, and $NH_2OH$ dissolved in said electrolyte.

2. In combination, anodic and cathodic terminals, an electrolyte, means including a conductive anodic structure in electrical contact with said anodic terminal for supplying positively charged ions to said electrolyte, and means including a conductive structure in contact with said cathodic terminal and said electrolyte for reducing said positively charged ions and neutralizing their charge, said last mentioned means also comprising $NH_2OH$.

3. In a process for generating electricity, the step of adding a cathodic reactant selected from the group consisting of $NH_2OH$ and salts thereof to an electric cell including an electrolyte and anodic means for supplying positively charged ions to said electrolyte.

4. An electricity generating cell comprising an anode, a cathode structure including carbon, and an electrolyte in contact with both said anode and said cathode structure, said electrolyte including $NH_2OH$.

5. An electricity generating cell comprising an anode, a cathode structure, an electrolyte in contact with both said anode and said cathode structure, and means for supplying $NH_2OH$ to said cathode structure.

6. A method for operating an electrical cell comprising supplying $NH_2OH$ to the cathodic structure of the cell.

7. An electricity generating cell comprising an anode, a cathode structure, and an electrolyte in contact with both said anode and said cathode structure, said electrolyte including dissolved $NH_2OH$ and magnesium bromide.

8. An electricity generating cell comprising an anode, a cathode structure, and an electrolyte in contact with both said anode and said cathode structure, said electrolyte including dissolved $NH_2OH$ and zinc chloride.

9. In a process for generating electricity, the step of adding a cathodic reactant selected from the group consisting of $NH_2OH$ and inorganic salts thereof to an electric cell including an electrolyte and anodic means for supplying positively charged ions to said electrolyte.

10. A depolarizer for an electric cell comprising carbon mixed with a cathodic reactant selected from the group consisting of $NH_2OH$ and inorganic salts thereof.

11. An electricity generating cell comprising an anode, a cathode structure, and an alkaline electrolyte in contact with both said anode and said cathode structure, said electrolyte including dissolved $NH_2OH$.

12. An electricity generating cell comprising an anode, a cathode structure, and an electrolyte in contact with both said anode and said cathode structure, said electrolyte including dissolved $NH_2OH$.

References Cited in the file of this patent
UNITED STATES PATENTS

| | | |
|---|---|---|
| 2,589,635 | Smith et al. | Mar. 18, 1952 |
| 2,874,079 | Lozier | Feb. 17, 1959 |
| 2,880,122 | Morehouse et al. | Mar. 31, 1959 |

OTHER REFERENCES

Creighton: Electrochemistry Principles, volume 1, 1924, page 270.